United States Patent [19]

DeVera et al.

[11] Patent Number: 4,482,172
[45] Date of Patent: Nov. 13, 1984

[54] DUAL SEALING FLUID CONNECTOR

[75] Inventors: Dennis DeVera, Mundelein; Nicholas Tzoumis, Roselle, both of Ill.

[73] Assignee: Eaton Corporation, Cleveland, Ohio

[21] Appl. No.: 281,825

[22] Filed: Jul. 9, 1981

[51] Int. Cl.³ .................. F16L 39/00; F16L 5/00
[52] U.S. Cl. .................. 285/137 R; 285/162; 285/194; 285/319; 285/DIG. 22
[58] Field of Search .......... 285/158, 162, 194, 137 R, 285/319, DIG. 22

[56] References Cited

U.S. PATENT DOCUMENTS

| | | | |
|---|---|---|---|
| 2,517,717 | 8/1950 | Rose | 285/137 R X |
| 2,543,909 | 3/1951 | Hatheway | 285/194 X |
| 2,841,418 | 7/1958 | Keating | 285/194 |
| 3,101,205 | 8/1963 | Benham | 285/162 |
| 3,221,572 | 12/1965 | Swick | 285/DIG. 22 |
| 3,654,382 | 4/1972 | Rubright | 285/162 X |
| 3,757,824 | 9/1973 | Parkhurst | 285/137 R X |
| 3,986,734 | 10/1976 | Davis | 285/158 |
| 4,005,882 | 2/1977 | Rickel et al. | 285/194 |
| 4,007,952 | 2/1977 | Fiddler | 285/137 R |

FOREIGN PATENT DOCUMENTS

| | | |
|---|---|---|
| 2405098 | 1/1974 | Fed. Rep. of Germany . |
| 1441837 | 7/1976 | United Kingdom | 285/162 |

Primary Examiner—Richard J. Scanlan, Jr.
Attorney, Agent, or Firm—Fay & Sharpe

[57] ABSTRACT

The dual sealing fluid connector connects and seals pneumatic control or other fluid conveying lines with a pneumatic or other fluid control device. The connector further provides a seal with a panel through which it extends to isolate the regions on either side of the panel from each other. The connector has a resilient body which extends through an aperture in the panel. The resilient body has a peripherally extending sealing projection for engaging one side of the panel around the aperture to prevent the environments on either side of the panel from intermixing through the aperture. The resilient body further has a pair of axial bores which are connected at one end with the pneumatic control lines and at their other end with the pneumatic control device. A panel mounting clip has engaging portions which project outward from the resilient body for engaging the second side of the panel to lock the panel between the sealing projection and the engaging portions. The panel mounting clip further includes a pair of elongated portions which extend from the engaging portions axially through the resilient body. An anchoring portion is connected with the elongated portions for restricting axial movement of the engaging portion.

16 Claims, 3 Drawing Figures

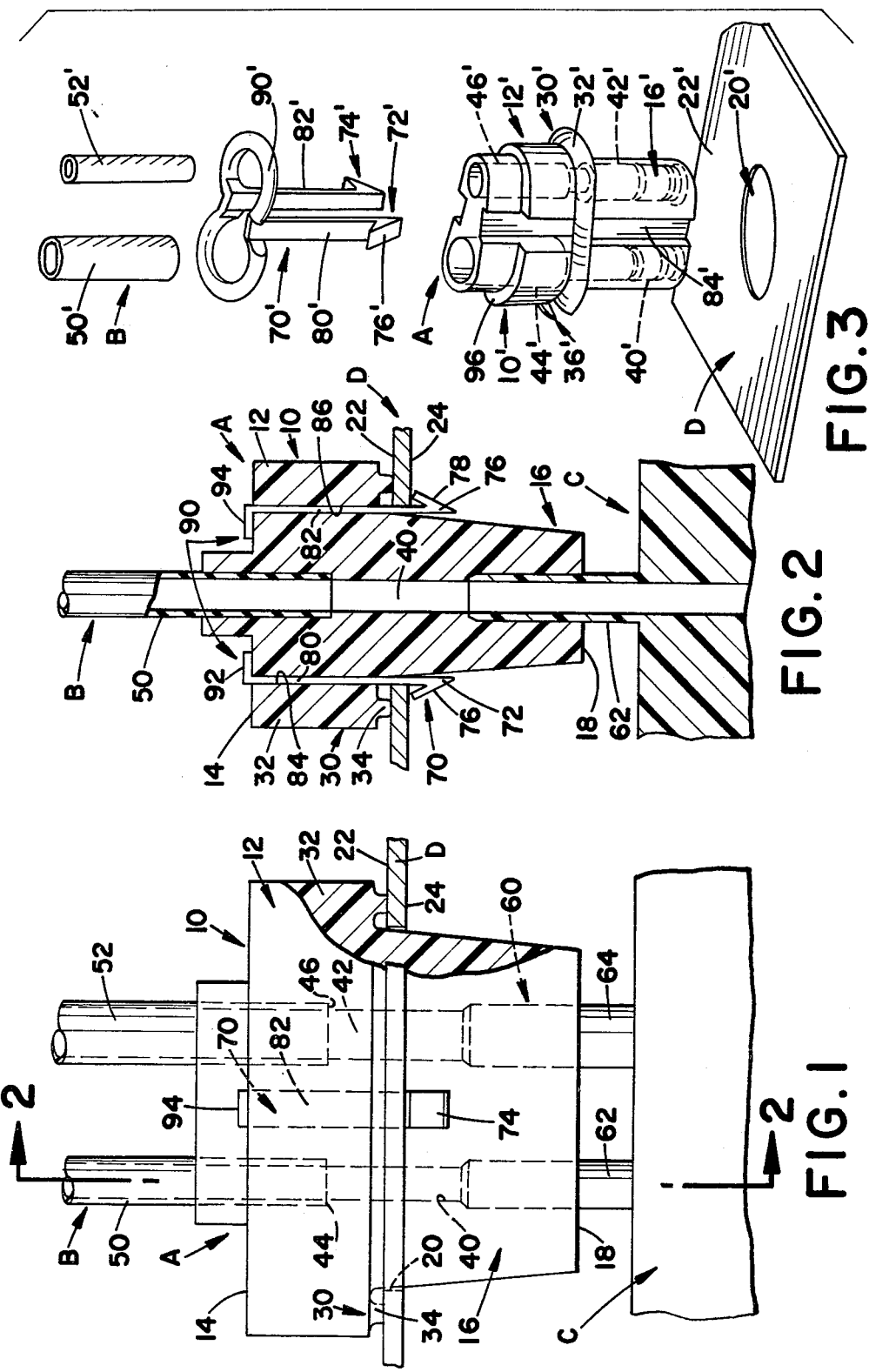

DUAL SEALING FLUID CONNECTOR

BACKGROUND OF THE INVENTION

This application pertains to the art of fluid connectors, particularly pneumatic and vacuum connectors. The invention is particularly applicable to connectors for automotive vacuum control lines for heater and air conditioner vacuum controls or the like. It is to be appreciated, however, that the invention has broader applications for connecting various types of liquid, gas, and other fluid control or conveying lines. The connector may find particular application in connections in which it is desirable to restrict any escaping or asperated fluids to a controlled region.

Heretofore, vacuum control connectors have commonly included a resilient body having one or more bores disposed axially therein. Each bore is secured at one end in fluid connection with a vacuum control line and is adapted for frictional engagement at the other end with a vacuum nipple of a vacuum control device. As automobiles have become smaller and their control systems more sophisticated, various problems have arisen with the prior art vacuum control connectors. One of the problems which has arisen is providing vacuum connections across body panels which are designed to isolate two regions. When an aperture was cut in the body panel to allow the prior art vacuum connectors to pass therethrough, the air in the regions on either side of the panel was able to intermix through the connector aperture. Another problem which has arisen is that the friction fit connectors were subject to being pulled from the control device causing the control function to be lost. Yet another problem has arisen in gaining access to restricted regions for interconnecting the vacuum connectors and the vacuum control devices. Generally, the vacuum control device was mounted first, often with restricted region around its vacuum connection nipples into which the vacuum control connector was maneuvered for coupling.

SUMMARY OF THE INVENTION

The present invention overcomes the above referenced problems and others. Yet it provides a fluid connector which is relatively inexpensive to manufacture, easy to install, and achieves a secure connection.

In accordance with the present invention, there is provided a fluid connector that has a first resilient body portion which is adapted to be mounted on one side of a panel and a second resilient body portion which is adapted to extend through an aperture in the panel toward the other side. The first resilient body portion includes a sealing means extending therearound for engaging the panel one side. The second resilient body portion includes a fluid coupling means which is adapted to be coupled with a fluid coupling device. A panel mounting means mounts the resilient body on the panel with the first body portion adjacent the panel one side.

In accordance with another aspect of the invention, there is provided a pneumatic control connector which is connected with at least one pneumatic control line and which is securely mountable with a panel aperture for later connection with a pneumatic control device. A resilient connector body has at least one enlarged bore extending generally axially therethrough. The bore is pneumatically connected with the pneumatic control line at one end of the resilient body and is adapted for frictionally receiving nipples of a pneumatic control device at the other end. The resilient body has a sealing projection which is larger than the panel aperture for engaging a first side of the panel. The resilient body further has at least one generally axially extending slot. A panel mounting means has a first elongated portion which extends through the axial slot and an engaging portion extending from the elongated portion outward from the resilient body to engage a second side of the panel.

One advantage of the present invention is that it provides a seal around a panel aperture for isolating the air on either side of the panel.

Another advantage of the present invention is that it provides a secure mechanical attachment with the panel to inhibit the connector from being uncoupled from a vacuum control device.

A further advantage of the present invention is that it is adapted to be mounted in a panel or subassembly first such that the vacuum control device can be connected thereto in a later assembly operation.

Still further advantages of the present invention will become apparent upon reading and understanding the following detailed description of the preferred embodiment.

BRIEF DESCRIPTION OF THE DRAWINGS

The invention may take form in various parts and arrangements of parts. The drawings are only for purposes of illustrating a preferred embodiment of the present invention and are not to be construed as limiting it.

FIG. 1 is a side view of a dual seal, fluid connector in accordance with the present invention in combination with a body panel and a vacuum control device;

FIG. 2 is an elevational view through section 2—2 of FIG. 1; and

FIG. 3 an exploded view of an alternate embodiment of the fluid connector of the present invention.

DETAILED DESCRIPTION OF THE PREFERRED EMBODIMENT

With particular reference to FIGS. 1 and 2, a dual-sealing connector A connects and seals fluid lines B with a fluid control device C. In the preferred embodiment, the fluid is air and the control device C is a pneumatic or vacuum control device. The connector A further provides a seal with a panel D to isolate the regions on either side of the panel. This maintains the environment surrounding the fluid control device C independent of the environment on the other side of the panel D.

The connector A has a resilient body 10 constructed of vinyl, synthetic rubber or the like. The resilient body 10 has a first body portion 12 adjacent a first end 14 and a second body portion 16 adjacent a second end 18. The resilient body 10 is adapted to extend through an aperture 20 in the panel D with the first portion 12 disposed adjacent a first side 22 of the panel D and the second portion 16 disposed contiguous with a second side 24 of the panel.

The first body portion 12 is integrally connected with a sealing means 30 for forming a seal between the resilient body and the first panel side 22. The sealing means 30 includes a sealing projection 32 which extends peripherally around the first body portion. Depending from the sealing projection 32 is a resilient sealing bead 34 for promoting the sealing engagement with the first panel side 22. The sealing projection 32 and resilient sealing bead 34 extend peripherally around the first body portion 12 and around the panel aperture 20. In the preferred embodiment, the sealing projection and bead extend totally around the periphery. However, it is to be appreciated that in some applications irregularities in the surface of the first panel side 22 or other structures passing through the panel may make it desirable for the sealing projection and bead to extend only partially or intermittently around the periphery.

With continued reference to FIGS. 1 and 2, a first bore 40 and a second bore 42 extend axially through the first and second body portions of the connector A from the first end 14 to the second end 18. In the first body portion 12, the first axial bore 40 has a first enlarged section 44 and the second axial bore 42 has a second enlarged section 46. The first enlarged section 44 receives one end of a first pneumatic or vacuum control line 50 and the second enlarged section 46 receives one end of a section pneumatic or vacuum control line 52. The pneumatic or vacuum control lines are attached to the resilient body 10 by suitable attachment techniques such as solvent welding.

The second body portion 16 includes a fluid coupling means 60, more specific to the preferred embodiment a pneumatic coupling means, which is adapted to be coupled with the pneumatic control device C. The pneumatic coupling means includes the inside surface of the first and second axial bores 40 and 42 which are dimensioned for a frictional, sealing engagement with fluid nipples 62 and 64 of the control device C.

With continued reference to FIGS. 1 and 2, the connector A further includes a panel mounting means 70 for mounting the connector A through the aperture 20 to the panel D. The panel mounting means includes a first engaging portion 72 and a second engaging portion 74 for engaging the second panel side 24. The first and second engaging portions have first and second camming surfaces 76 and 78, respectively, which are cammed by the edge of aperture 20 against the resilient body 10 as the connector is inserted in the aperture. In this manner, the resiliency of the resilient body functions as a biasing means for biasing the engaging portions 72 and 74 into engagement with the second panel side 24. The engaging portions 72 and 74 have second panel side engaging surfaces which are disposed generally proximate to the sealing bead 34 to engage the panel D therebetween. The distance between the engaging surfaces and the sealing bead is slightly less than the panel thickness between its first and second sides such that the sealing bead is compressed against the first panel side 22.

A first elongated portion 80 and a second elongated portion 82 extend axially from the first and second engaging portions, respectively, toward the resilient body first end 14. To accommodate the first and second elongated portions, the resilient body 10 has a pair of axial slots 84 and 86. An anchoring means 90 is connected with the first and second elongated portions for restricting their axial movement relative to the resilient body. In the embodiment of FIGS. 1 and 2, the anchoring means includes a first enlargement 92 and a second enlargement 94 which abut the resilient body first end 14 to limit the distance between the engaging surfaces and the sealing bead.

With reference to FIG. 3, there is illustrated an alternate embodiment of a dual sealing fluid connector in which like elements are marked with the same reference numerals as the corresponding element in the embodiment of FIGS. 1 and 2 but followed by a prime ('). The connector includes a resilient body portion 10' having a first body portion 12' and a second body portion 16'. The second body portion 16' of the resilient body 10' is adapted to extend through an aperture 20' in panel D while the first body portion 12' remains adjacent a first panel side 22'.

The resilient body 10' is integrally formed with a sealing means 30' including a peripheral projection 32' extending peripherally therearound. The sealing projection 32' has a recess or cutout area 36 which enables the connector to be disposed closely adjacent another structure.

First and second bores 40' and 42' extend axially through the resilient body for providing fluid, specifically pneumatic, communication therethrough. At one end of the bores are enlarged sections 44' and 46' for receiving pneumatic control lines 50' and 52'. Adjacent the other end, the bores have a plurality of annular ribs or projections for improving the frictional engagement between the bores and the fluid or pneumatic nipples of the associated fluid or pneumatic control device.

A panel mounting means 70' includes first and second engaging portions 72' and 74' for engaging the lower surface of panel D. First and second elongated portions 80' and 82' connect the engaging portions with an anchoring means 90'. The anchoring means is a peripheral ring which connects both elongated portions and abuts a peripheral ledge 96 of the resilient body to restrict axial movement of the engaging portions 72' and 74'.

The dual-sealing connector is ideally suited for use in conjunction with air conditioning temperature control devices. The air conditioning temperature control devices senses the temperature of the passenger compartment air on the second panel side 24 and sends pneumatic signals along pneumatic lines B to cause the air conditioner to be actuated or deactuated. To assure accurate temperature control, the passenger compartment air on the second side of panel D is isolated from the higher temperature engine compartment air on the other side of panel D.

The invention has been described with reference to the preferred embodiment. Obviously, modifications and alterations will occur to others upon reading and understanding the detailed description of the preferred embodiment. It is our intention that our invention include all such alterations and modifications which come within the scope of the appended claims or the equivalents thereof.

Having thus provided a detailed description of our preferred embodiment, we now claim our invention to be:

1. A pneumatic control connector which is connected with at least one pneumatic control line and which is securely mountable through a panel aperture for later connection with a pneumatic control device, the connector comprising:

a resilient body having at least one enlarged fluid conveying bore extending generally axially therethrough, the bore being pneumatically connected with the pneumatic control line at a first end of the resilient body and being adapted for frictionally receiving nipples of the pneumatic control device at a second end;

the resilient body having a sealing projection extending peripherally therearound surrounding the panel aperture for engaging a first side of the panel;

the resilient body defining at least a first slot extending generally axially, the first slot being disposed inward from the sealing projection; and a panel mounting means including:

a first elongated portion extending along the first slot, an anchoring portion connected adjacent a first end of the first elongated portion for abutting the resilient body to restrict axial movement thereof, and, a first engaging portion adjacent another end of the first elongated portion extending outward from the resilient body for engaging a second side of the panel.

2. The connector as set forth in claim 1 wherein the panel mounting means further includes a second elongated portion extending along a second slot in the resilient body and a second engaging portion extending from the second elongated portion outward from the resilient body for engaging the panel second side.

3. The connector as set forth in claim 2 wherein the panel mounting means includes a second anchoring portion connected with the second elongated portion and adapted to abut the resilient body generally adjacent the first end to restrict axial movement of the second engaging portion.

4. The connector as set forth in claim 3 wherein the anchoring portions are adapted to engage a peripheral edge disposed on the resilient body between the first end and the sealing projection.

5. The connector as set forth in claim 2 wherein the first and second engaging portions include first and second camming surfaces for camming the first and second engaging portions, respectively, against the resilient body and through the panel aperture.

6. A connector for connecting plural lines through an aperture in a panel, the connector comprising:

a resilient body having a first body portion which is adapted to be mounted on a first side of the panel and a second body portion which is adapted to extend through the aperture in the panel, the resilient body defining a first fluid conveying bore extending axially through the first and second body portions and defining a first fluid coupling means at least adjacent the second body portion for interconnection with a fluid device, the resilient body further defining a second axial bore spaced from the first bore and extending through the first and second body portions and defining at least a second fluid coupling means adjacent the second body portion for coupling the second bore with the fluid device;

the first portion including a sealing means adjacent the second body portion and extending therearound for engaging the panel first side surrounding the aperture in a sealing relationship; and, a clip means received through the first body portion, inside the sealing means, and adjacent a peripheral surface of the second body portion such that upon receipt in the panel aperture the clip means extends therethrough and engages a panel second side, the clip means being disposed closely adjacent the resilient second body portion such that the resilient second body portion biases the clip means outward for engagement with the panel second side.

7. The connector as set forth in claim 6 wherein the clip means includes an elongated portion extending along the first and second body portions from an engaging portion which extends outward from the second body portion for engaging the panel second side.

8. The connector as set forth in claim 7 wherein the clip means further includes an anchoring means connected with the elongated portion for restricting axial movement of the elongated portion.

9. The connector as set forth in claim 7 wherein the first body portion has at least one slot extending therethrough, the elongated portion extending through said slot.

10. The connector as set forth in claim 9 wherein the engaging portion has a camming surface such that the engaging portion is cammed against the resilient body as the engaging portion passes through the panel aperture.

11. The connector as set forth in claim 9 wherein the clip means further includes a second elongated portion extending through a second slot in the first body portion and a second engaging portion connected with the elongated portion for engaging the panel second side.

12. The connector as set forth in claim 11 wherein the first and second elongated portions are integrally connected.

13. The connector as set forth in claim 11 wherein the sealing means includes a resilient projection extending peripherally generally around the first body portion and the first and second slots.

14. The connector as set forth in claim 13 wherein the sealing means further includes a sealing bead extending along the sealing projection.

15. The connector as set forth in claim 13 wherein the sealing projection extends totally around the periphery of the first body portion.

16. The connector as set forth in claim 13 wherein the first and second engaging portions and the peripheral projection are displaced from each other by a distance which is less than the distance between the panel first side and the panel second side, whereby the sealing projection is compressed against the panel first side when the engaging portions engage the panel second side.

* * * * *